United States Patent [19]

Eng et al.

[11] 3,997,427
[45] Dec. 14, 1976

[54] REDUCING HYDROGEN CONSUMPTION IN HYDROTREATING PETROLEUM FRACTIONS

[75] Inventors: Jackson Eng; Noel J. Gaspar, both of Sarnia, Canada

[73] Assignee: Exxon Research and Engineering Company, Linden, N.J.

[22] Filed: Dec. 24, 1975

[21] Appl. No.: 644,184

[52] U.S. Cl. .................................. 208/67; 208/97
[51] Int. Cl.² ......................................... C10G 37/06
[58] Field of Search ................ 208/210, 62, 66, 59, 208/58, 67, 68, 97

[56] References Cited

UNITED STATES PATENTS

| | | | |
|---|---|---|---|
| 3,050,457 | 8/1962 | Wilson | 208/67 |
| 3,098,029 | 7/1963 | Snyder, Jr. | 208/58 |
| 3,248,317 | 4/1966 | Pohlenz et al. | 208/58 |
| 3,679,576 | 7/1972 | McDonald | 208/67 |
| 3,694,344 | 9/1972 | Munro | 208/58 |
| 3,844,734 | 10/1974 | Johnson | 208/97 |
| 3,928,176 | 12/1975 | Hamner et al. | 208/97 |

Primary Examiner—George Crasanakis
Attorney, Agent, or Firm—Edward M. Corcoran

[57] ABSTRACT

A process for hydrotreating middle distillate fraction petroleum feed stocks wherein hydrogen requirements for the hydrotreater are reduced by first passing the feed stock and steam to a steam hydroconversion zone over a dual function catalyst comprising molybdenum on a chromium supported on ferric oxide support or on a high surface area alumina support. In the steam hydroconversion zone a portion of the feed reacts with the steam to produce hydrogen via a steam reforming reaction. This hydrogen is used in situ to saturate a substantial portion of the olefins and remove some of the sulfur compounds present in the feed stock, thereby partially refining same. The partially refined feed is then passed to a hydrotreating zone for further treatment with greatly reduced hydrogen requirements in said hydrotreating zone.

21 Claims, 2 Drawing Figures

REDUCING HYDROGEN CONSUMPTION IN HYDROTREATING PETROLEUM FRACTIONS

BACKGROUND OF THE INVENTION

1. Field of the Invention

This invention relates to a two-zone hydrotreating process for middle distillate petroleum fractions. More particularly, this invention relates to an improved process for removing sulfur and nitrogen compounds and hydrogenating olefins and polynuclear aromatics present in middle distillate petroleum feed stocks. Still more particularly, this invention relates to reducing hydrogen consumption in hydrotreating processes by first passing steam and the petroleum feed to a steam hydroconversion zone to produce hydrogen therein and wherein the hydrogen produced reacts in situ in said zone to partially saturate and desulfurize said feed before same is passed to the hydrotreating zone, thereby greatly reducing hydrogen requirements for the hydrotreating zone.

2. Description of the Prior Art

The petroleum industry is increasingly turning to coal, tar sands and heavy crudes as sources for future raw materials. Feed stocks derived from these heavy materials are more deficient in hydrogen and higher in sulfur and nitrogen than feed stocks derived from more conventional crude oils. Such feed stocks are also referred to as being dirtier. These feeds therefore require a considerable amount of upgrading in order to obtain usable products therefrom, such upgrading or refining generally being accomplished by hydrotreating which includes reactions such as hydrodesulfurization to remove sulfur compounds, hydrogenating to saturate olefins and condensed aromatics and also hydrodenitrogenation. Hydrotreating requires large volumes of hydrogen and consequently incurs relatively high processing costs. It is therefore desirable to develop hydrotreating processes with reduced hydrogen consumption.

One way of obtaining hydrogen is via steam reforming. Steam reforming is well known to those familiar in the art as a process for producing hydrogen or hydrogen containing gas mixtures by converting hydrocarbons with steam. Hydrocarbons present in a feed react with steam to form carbon monoxide and hydrogen in a gasification reaction. The carbon monoxide is then reduced to a low level by a water gas shift reaction, which also produces more hydrogen. The two reactions combine in steam reforming as illustrated by the following equations.

Steam reforming: $CnH_2n + 2nH_2O \longrightarrow 3nH_2 + nCO_2$

= a) gasification: $CnH_2n + nH_2O \longrightarrow 2nH_2 + nCO$

+ b) water gas shift: $nCO + nH_2O \longrightarrow nH_2 + nCO_2$

Unfortunately, most catalysts used for steam reforming are not resistant to sulfur and, consequently, their catalytic activity rapidly diminishes to an unacceptably low level in the presence of sulfur-containing hydrocarbons. Further, many of the well known sulfur tolerant hydrogenation catalysts are deactivated in the presence of steam and are therefore unsuitable in steam reforming processes. The prior art teaches that if one desires to hydrotreat a sulfur-containing feed and make use of steam reforming as a source of hydrogen with the sulfur-containing feed, the feed must be passed to a first zone wherein the sulfur is removed, followed by steam reforming in a second zone to produce hydrogen from the desulfurized feed, followed by passing the feed, along with the hydrogen produced in the steam reforming zone to a third zone wherein the olefinic and polynuclear aromatic components in the feed are saturated via catalytic hydrogenation.

It would therefore be a significant improvement to the art if one could employ steam hydroconversion in a single zone, with a sulfur-containing feed, to produce hydrogen and utilize the hydrogen so produced to in situ saturate at least a portion of the olefins and polynuclear aromatics in the feed in said zone, as well as removing at least some of the sulfur therefrom to produce a semi-refined or hydrotreated feed, and then pass same to a hydrotreating zone to saturate the remaining olefins and polynuclear aromatics along with the hydrodesulfurization and hydrodenitrogenation of the sulfur and nitrogen compounds contained therein. This would greatly reduce the hydrogen requirements for the hydrotreating zone.

SUMMARY OF THE INVENTION

In the process according to this invention, hydrogen requirements for hydrotreating sulfur and olefin containing middle distillate petroleum feed stocks are greatly reduced by first passing said feed and steam into a steam hydroconversion zone over a dual-function catalyst comprising molybdenum on a high surface area alumina base or on chromium supported on a ferric oxide base before the feed is passed to a hydrotreating zone, said catalyst having been reduced and sulfided prior to use. In the steam hydroconversion zone, hydrocarbons in the feed react with the steam to produce hydrogen, with the hydrogen so produced reacting in situ in said zone to saturate olefins and polynuclear aromatics present in the feed and remove at least a minor portion of the sulfur compounds therefrom via hydrodesulfurization. It has also been discovered that the addition of minor amounts of alkali and/or alkaline earth metals will greatly improve the life of the steam hydroconversion catalyst.

Steam hydroconversion refers to a combination of steam reforming and hydroconversion processes. By steam reforming is meant the combination gasification plus water gas shift reactions described under the prior art, supra, wherein at least a portion of the hydrocarbon stream reacts with steam to produce carbon dioxide and hydrogen. Hydroconversion processes refer to at least partial hydrodesulfurization of the feed and saturation or hydrogenation of olefins and polynuclear aromatics present therein, along with some hydrocracking of the heavier or higher boiling portions of the feed and attendant hydrogenation of any hydrocrackate so formed. The following equations illustrate the steam hydroconversion of propylene to form propane, wherein the maximum theoretically obtainable yield at 100% conversion is 90 mole % of propane.

a. steam reforming:

$C_3H_6 + 0.6 H_2O \rightarrow 0.9 C_3H_6 + 0.3 CO_2 = 0.9 H_2$ b. hydrogenation:

$0.9 C_3H_6 + 0.9 H_2 \rightarrow 0.9 C_3H_8$ c. overall:

continued $$C_3H_6 + 0.6 H_2O \rightarrow 0.9 C_3H_8 + 0.3 CO_2$$

Hydrotreating refers to a process for upgrading hydrocarbon stocks by catalytic treatment with hydrogen. More particularly within the context of the instant invention, hydrotreating refers to a catalytic process for removing sulfur and nitrogen compounds from hydrocarbons as well as saturation of olefins and polynuclear aromatics present therein, by contacting the hydrocarbon with hydrogen in the presence of a suitable catalyst at hydrotreating conditions. Although the process of this invention is applicable to the steam hydroconversion and hydrotreating of any hydrocarbon stream containing olefins and sulfur, it is especially useful when used with middle distillate petroleum fractions. Further, although this invention is most advantageously used with sulfur containing feeds, it will also work with feeds containing little or no sulfur.

Catalysts useful in the steam hydroconversion process of the instant invention comprise dual function steam hydroconversion catalysts that are resistant to both steam and sulfur, said catalysts comprising molybdenum alone or in admixture with a metal selected from the group consisting of cobalt, chromium or mixtures thereof as the active catalytic metals on either a chromium supported on ferric oxide base or on a high surface area alumina base, said catalyst having been reduced and sulfided prior to its use. Additionally, it has been found that the effective life of the catalyst is greatly increased if the catalyst is promoted with small amounts of one or more alkali and/or akaline earth metals.

Although it is preferred that the catalytic metals initially be present on the catalyst as sulfides, said metals may also initially be present on the catalyst as oxides, reduced forms of the metal or as mixtures of these and other forms. What is important to the operation of this invention is that the catalytically active metals be converted to the sulfide form either prior to use in the manufacture thereof, by pretreating same prior to its use in the operation of the instant invention or by in situ conversion of the oxides or reduced forms to the sulfides by sulfur-containing feeds. These metals will be present in the catalyst in catalytically active amounts, e.g., from about 5 to about 50 wt.% (calculated as metal), preferably from about 10 to about 40 wt.% and most preferably from about 15 to about 30 wt.% based on the total weight of the catalyst when the active metal is molybdenum. Particularly preferred catalysts include (a) 25 to 50 wt.% molybdenum sulfide and (b) 15 to 30 wt.% molybdenum sulfide along with 2 to 10 wt.% of cobalt sulfide based on the total weight (dry basis) of the catalyst composition.

In addition to the catalytically active metal components, the catalyst may also contain minor amounts of other Group VIB and VIII metals such as tungsten, platinum, rhenium and nickel which, while not necessarily catalytically active in the steam hydroconversion process of this invention, have been found not to exert a deleterious effect to the operation of same. As much as 5 wt.% of these other metals may be present on the catalyst without incurring any deleterious effect.

The ratio of molybdenum to cobalt in catalysts containing both of these metals will generally range from about 1.5/1 to 20/1, preferably 3.5/1 to 10/1 and most preferably from 4.5/1 to 8.5/1. If minor amounts of other Group VIB or VIII metals are present, the ratio of molybdenum to these other metals will generally range from about 50/1 to 5/1 and preferably from 25/1 to 10/1.

The alumina support material employed in the catalysts for the steam hydroconversion process of this invention is most preferably a high surface area type of alumina having a surface area of from about 100 to about 400 m²/g (square meters per gram) and most preferably from about 150 to about 350 m²/g. A particularly preferred alumina support is η-alumina which has a surface area of approximately 300 m²/g. Although the presence of silica in the alumina support is detrimental to the steam hydroconversion process of the instant invention, the support may contain up to about 5 wt.% silica (based on the total weight of the support) without incurring any serious adverse effects to the steam hydroconversion process. As hereinbefore stated, supra, the catalyst life is greatly improved by the addition of minor amounts of alkali and/or alkaline earth metals illustrated by, but not limited to, metals such as barium and cesium. In general, these metals will range from about 1 to 10 wt.% (based on total catalyst weight) and preferably from about 2.5 to about 10 wt.%. The alkali and/or alkaline earth metals may be incorporated into the catalyst base in the form of acetates or carbonates.

A particularly preferred catalyst useful in the steam hydroconversion process of the instant invention comprises from about 25 to about 50 wt.% of molybdenum sulfide and from about 2 to 8 wt.% cesium carbonate based on the total weight (dry basis) of the catalyst, supported on an η-alumina base.

As to catalysts useful in the steam hydroconversion process or zone of the instant invention employing ferric oxide as the base, a particularly preferred catalytic composition comprises from about 20 to about 30 wt.% molybdenum on chromium supported on a ferric oxide base, wherein the amount of molybdenum is based on total catalyst composition and the chromium content thereof ranges from about 1 to 15 wt.%. By a chromium on ferric oxide base is meant a ferric oxide base containing 1 to 15 wt.% chromic oxide which has a surface area of about 100 m²/g.

The steam hydroconversion catalysts useful in this invention may be prepared by any conventional manner known in the art. For example, a commercial alumina of the desired surface area in the form of pellets or extrudates is soaked in the aqueous solution of ammonium molybdate containing the desired amount of molybdenum. The water is removed in a flash evaporator and the resulting catalyst dried at 230° F and calcined in air at about 930° F for one hour. Prior to use the catalyst may be reduced and sulfided by passing a mixture of 10% H₂S in hydrogen over the catalyst at about 930° F for one hour or until H₂S breakthrough. The hydrogen/H₂S stream may be diluted with inert gas to prevent overheating due to the exothermic nature of the reduction/sulfiding reactions.

The chromium on iron oxide support may be prepared by coprecipitating a mixture of chromium and iron hydroxides by the addition of sodium hydroxide solution to an aqueous solution of ferrous sulfate and chromic acid containing the desired amount of iron and chromium. The hydroxide precipitate is air dried at up to about 1100° F, during which time the hydroxides are oxidized to chromic and ferric oxides. The resulting material may be pelletized or extruded by standard methods. Molybdenum is then deposited on this base using the same method described above for the alumina base and the resulting catalyst calcined, reduced and sulfided as previously described. During the sulfiding step the chromium and iron oxides may also be converted to their sulfide forms.

In the steam hydroconversion zone of this invention, a sulfur and olefin-containing middle distillate petroleum feed stock is contacted with a steam hydroconversion catalyst described, supra, at a temperature in the range of from about 500° to 1200° F, preferably 750° to 1000° F; a pressure in the range of from 0 to 2000 psig, preferably 0 to 1000 psig, a steam-to-feed ratio of from 0.5 to 10 and preferably 1.5 to 6.5, and with a liquid hourly space velocity (V/V/Hr) in the range of 0.3 to 10 and preferably 0.8 to 3.

In the operation of this invention, hydrotreating in the hydrotreating zone refers to catalytic hydrodesulfurization, hydrodenitrogenization and hydrogenation of olefins and polynuclear aromatics present in the feed. In general, any of the well known sulfur resistant hydrotreating catalysts are operable in the hydrotreating zone of the instant invention illustrated by, but not limited to, catalysts such as cobalt and molybdenum on alumina, nickel, cobalt and molybdenum on alumina, nickel and molybdenum on alumina, nickel and tungsten on alumina, tungsten on alumina or silica/alumina, etc.

It is desirable to hydrogenate and desulfurize the feed as much as possible in the steam hydroconversion zone before same is passed to the hydrotreating zone. However, this is limited by coke deposition on the catalyst which causes rapid deactivation of same. Hence, it is desirable to operate the steam hydroconversion zone at as severe conditions as possible without laying down large amounts of coke on the catalyst.

In accordance with this invention, the hydrotreating conditions include a temperature in the range of 500° to 1200° F, preferably 550° to 800° F, a hydrogen partial pressure in the range of 0 to 5000 psig and preferably 200 to 2500 psig, a liquid hourly space velocity (V/V/Hr) in the range of 0.2 to 20 and preferably 0.5 to 3. The total hydrogen supply rate (make up and recycle hydrogen) will generally range from 200 to 10,000 standard cubic feet per barrel (SCF/B) of feed stock and preferably 500 to 1500 SCF/B.

The feed stocks employed in the process of the present invention generally include middle distillate petroleum fractions such as kerosene, heating oil, light catalytic heating oil, cycle oil, diesel oil, etc., boiling in the general range of from about 300° to about 1000° F and containing at least 20 wt.% olefins. The process of this invention is particularly applicable to those middle fractions relatively high in sulfur and unsaturated components such as olefins and polynuclear aromatics. These feeds can contain from about 500 parts per million (ppm) of sulfur up to as much as 20,000 ppm.

Although the olefinic content of the feed can range from less than 20 up to 100 wt.%, the advantage of the process of the instant invention is most evident with feeds containing significant quantities of unsaturates (i.e., above 20 wt.%), otherwise the hydrogen requirements in the hydrotreating zone are not greatly reduced. Feeds derived from heavier materials, such as heavy crudes, tar sands, coal and shale oil, will contain considerably more olefins, sulfur, nitrogen and unsaturated polynuclear aromatics than those derived from more conventional crudes. Although feeds relatively lower in sulfur and even containing no sulfur compounds may be used in the process of this invention, one of the outstanding features of same is the ability to steam hydroconvert, in a single zone, relatively high sulfur containing feeds containing over 5000 ppm of sulfur.

DETAILED DESCRIPTION

Figure 1:
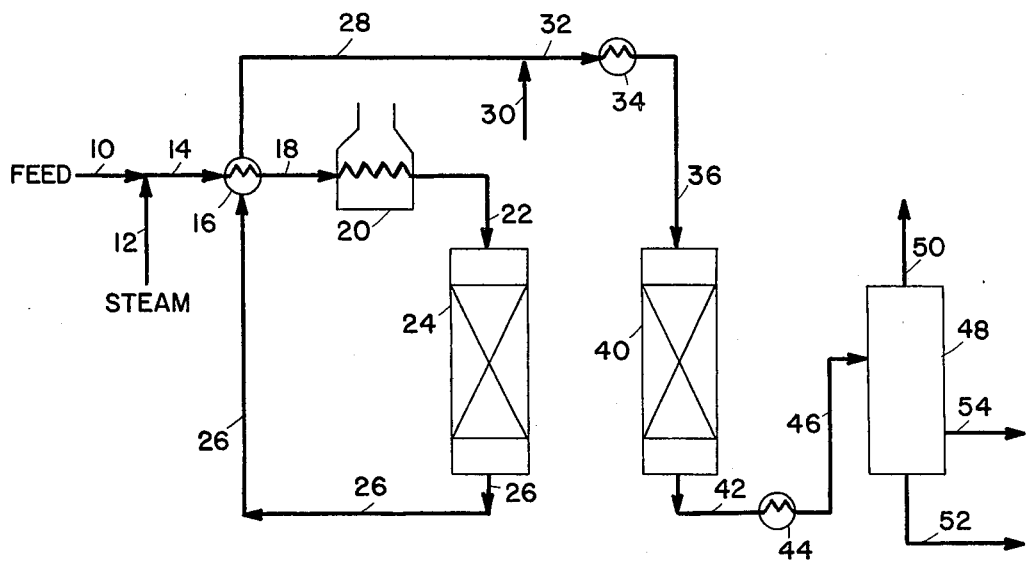
FIGS. 1 and 2 are flow diagrams of preferred embodiments of the invention.

Referring to FIG. 1, a light gas oil feed derived from a cracking process such as cat cracking, coking, steam cracking, etc., and boiling in the range of about 300° to 650° F is passed through line 10 wherein it is mixed with steam entering line 10 via line 12, with the oil/steam mixture then passing to preheat heat exchanger 16 and furnace 20 via lines 14 and 18, respectively, with the hot oil/steam mixture then passing into steam hydroconversion reactor or zone 24 via line 22 wherein said mixture is contacted with a dual-function steam hydroconversion catalyst of the instant invention resulting in partial hydrodesulfurization and hydrogenation of the olefins present in the oil. The steam/feed ratio and steam hydroconversion conditions and catalyst are described in Example 1, infra. The oil leaves reactor 24 via line 26, passes through heat exchanger 16 from whence it is passed through line 28 wherein it is mixed with hydrogen entering line 28 via line 30, with the oil/hydrogen mixture then passing via line 32 to heat exchanger 34 wherein it is cooled and from there to hydrotreater 40 via line 36. In reactor 40 the oil/hydrogen mixture is contacted with a hydrotreating catalyst, at hydrotreating conditions, with the reaction products leaving reactor 40 via line 42, heat exchanger (cooler) 44 and then to separator 48 via line 46. The hydrogen/feed ratio, hydrotreating catalyst and conditions are also discussed in Example 1, infra. Hydrogen leaves separator 48 via lines 50, with water leaving via line 52 and the saturated and desulfurized product leaving separator 48 via line 54.

Figure 2:
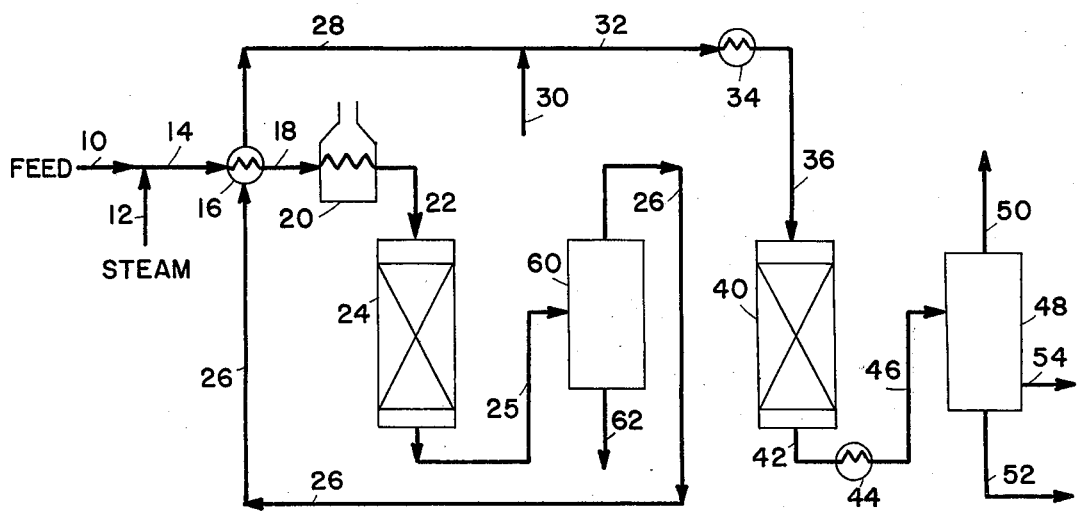

The preferred embodiment illustrated by the flow diagram in FIG. 2 is similar to that of FIG. 1, except that the process FIG. 2 employs a heavier feed which requires the use of a splitter between the steam hydroconversion reactor and the hydrogenator. Referring to FIG. 2, a feed such as a wide cut gas oil boiling in the range of from about 300° to 1000° F is passed through line 10 wherein it is mixed with steam entering via line 12, with the oil/steam mixture then passing through preheat exchanger 16 and furnace 20 to steam hydroconversion zone 24 via lines 14, 18 and 22, respectively. In steam hydroconversion zone 24 the oil/steam mixture is contacted with a steam hydroconversion catalyst of the instant invention, at steam hydroconversion conditions, resulting in partial hydrodesulfurization and saturation of the olefins in the feed, along with cracking and hydrogenation of a substantial (at least 20% and up to 50% or more) portion of the feed boiling above about 750° F to material boiling below 750° F. The steam/feed ratio and steam hydroconversion catalyst and conditions are described in Example 2, infra. Product from steam hydroconversion zone 24 passes via line 25 into splitter 60 wherein lighter material such as a light gas oil boiling below about 750° F is separated from heavier material such as that boiling above about 750° F. The heavier material contains most of the metals, etc. and, if passed to hydrotreating zone 40, can cause fouling and poisoning of the catalyst contained therein. Therefore, the heavy material is removed from splitter 60 via line 62 with the lighter material passing overhead through heat exchanger 16 via line 26, then through line 28 wherein it is mixed with hydrogen entering line 28 via line 30, with the mixture then passing to hydrotreating zone 40 via line 32, heat exchanger 34 and line 36. In hydrotreater 40 the oil/hydrogen mixture is contacted with a hydrotreating catalyst, such as cobalt and molybdenum on alumina, at hydrotreating conditions, with the reaction products leaving reactor 40 via line 42, through heat exchanger 44 and then to separator 48 via line 46. The hydrogen/feed ratio, hydrotreating catalyst and conditions are also described in Example 2, infra. Hydrogen leaves separator 48 via line 50, with water leaving via line 52 and the saturated and desulfurized product leaving separator 48 via line 54.

PREFERRED EMBODIMENT

The invention will be more apparent from the examples set forth below.

EXAMPLE 1

This example is calculated based on the process described in FIG. 1. A light gas oil feed derived from cat cracking and boiling in the range of about 300° to 650° F is mixed with steam in a mole ratio of about 4/1 steam/feed. This mixture is heated to about 850° F and contacted with a dual-function steam hydroconversion catalyst in a steam hydroconversion zone. The catalyst is composed of 25 wt.% molybdenum (sulfided) on an $\eta$ -alumina base having a surface area of 300 m²/g. Pressure in the steam hydroconversion zone is about 600 psig and the normalized space velocity of the oil is 1 V/V/Hr. In said zone the oily feed is partially hydrogenated and partially hydrodesulfurized. The steam hydroconverted material is removed from the steam hydroconversion zone, mixed with hydrogen at a rate of about 1000 SCF/B (standard cubic feet per barrel), adjusted to a temperature of about 700° F and passed into a hydrotreating zone in the presence of a cobalt and molybdenum on alumina catalyst at a pressure of 1500 psig and normalized hydrocarbon space velocity of 1 V/V/Hr. Reaction products are passed from the hydrotreating zone to a splitter wherein hydrogen, water and saturated, desulfurized liquid hydrocarbon product are separated and then removed therefrom.

The results in Table 1 show that substantially less hydrogen is required to saturate and desulfurize the feed by employing the process of the instant invention.

TABLE 1

|  | Feed | Product from Steam Hydroconversion Zone | Product from Hydrotreating Zone |
|---|---|---|---|
| Gravity, °API | 29 | 31 | 32 |
| Bromine No. | 50 | 20 | 5 |
| Sulfur, Wt.% | 2.5 | 1.25 | 0.05 |
| H₂ Consumption, SCF/B | — | — | 300 |
| H₂ Consumption without steam hydroconversion zone, SCF/B | — | — | 655 |

EXAMPLE 2

This example is calculated based on the process described in FIG. 2 using, as a feed, a coker gas oil derived from Athabasca bitumen and boiling in the range of 400° to 1000° F. The feed is mixed with steam in a mole ratio of 4/1 steam/feed, heated to 900° F and passed into a steam hydroconversion zone in the presence of a dual-function steam hydroconversion catalyst containing 5% cobalt and 20% molybdenum (sulfided) on an $\eta$ -alumina base. In the steam hydroconversion zone a portion of the olefins in the feed are hydrogenated, a portion of the sulfur removed as H₂S and a substantial portion of the feed boiling above 750° F is hydroconverted to material boiling below 750° F. All of the hydrocarbons are passed from the steam hydroconversion zone to a splitter which separates light gas oil boiling up to 750° F from the 750° F plus material. The light gas oil from the splitter is mixed with 1500 SCF/B of hydrogen. The mixture is then heated to about 700° F and is passed into a hydrotreating zone at 1500 psig in the presence of a conventional cobalt molybdate on alumina hydrotreating catalyst. The liquid hourly space velocity of the light gas oil in the hydrotreating zone at standard temperature and pressure is about 1 V/V/Hr. In the hydrotreating zone the olefins are saturated and sulfur is removed from the light gas oil. Effluent from said zone passes into a separator wherein water, hydrogen and product are separated and removed therefrom as separate streams.

Table 2 show, that substantially less hydrogen is required when the steam hydroconversion step of the instant invention is incorporated in the process scheme.

TABLE 2

|  | Feed | Steam Hydroconversion Product | Hydrotreating Product |
|---|---|---|---|
| Gravity, °API | 14 | 22 | 35 |
| Sulfur, Wt.% ppm | 4.0 | 3.1 | 0.1 |
| Bromine No. | 30 | 15 | 3 |
| Vol. % Boiling greater than 750° F | 50 | 25 | Nil |
| H₂ Consumption, SCF/B | — | — | 425 |
| H₂ Consumption, SCF/B if steam hydroconversion zone is eliminated | — | — | 710 |

What is claimed is:

1. In a process for hydrotreating a middle distillate petroleum feed stock to saturate olefins present therein as well as remove sulfur and nitrogen compounds therefrom, the improvement which comprises passing said feed stock and steam into a steam hydroconversion zone over a dual-function catalyst comprising molybdenum on a base selected from the group consisting of a chromic oxide and ferric oxide base and on a high surface area alumina base at steam hydroconversion conditions before said feed is passed to a hydrotreating zone, thereby reducing hydrogen requirements in said hydrotreating zone, said steam hydroconversion catalyst being sulfided prior to use.

2. The process of claim 1 wherein the catalyst contains a minor amount of one or more metals selected from the group consisting of alkali metal, alkaline earth metal, and mixture thereof.

3. The process of claim 2 wherein the surface area of the alumina base ranges from about 100 to 400 m²/g.

4. The process of claim 3 wherein said feed stock contains at least about 20 wt.% olefins.

5. The process of claim 4 wherein said feed stock boils in the range of from about 300° F to about 1000° F.

6. The process of claim 5 wherein said catalyst contains from 25 to 50 wt.% molybdenum sulfide.

7. The process of claim 6 wherein said catalyst contains from 15 to 30 wt.% molybdenum sulphide and from 2 to 10 wt.% cobalt sulfide based on the total weight of the catalyst.

8. The process of claim 7 wherein the amount of said metal sulfide on said base ranges from about 5 to 50 wt.% based on the total weight of the catalyst.

9. The process of claim 7 wherein minor amount of alkali metal, alkaline earth metal, and mixture thereof ranges from 1 to 10 wt.% based on the total weight of the catalyst.

10. The process of claim 9 wherein said alkali metal and earth metal is selected from the group consisting of barium and cesium.

11. The process of claim 10 wherein said feed stock contains at least 500 ppm of sulfur.

12. The process of claim 11 wherein the catalyst base is η-alumina.

13. The process of claim 1 wherein said catalyst conains 20 to 30 wt.% molybdenum on said base comprising 1 to 15 wt.% chromic oxide and ferric oxide.

14. In a process for hydrotreating a middle distillate petroleum feed containing olefins and sulfur compounds and boiling in the range of from 300° F to 1000° F, the improvement which comprises passing said feed and steam to a steam hydroconversion zone over a dual-function steam hydroconversion catalyst comprising molybdenum on a base selected from the group consisting of a high surface area alumina base or on a chromic oxide and ferric oxide base at steam hydroconversion conditions in order to saturate at least a portion of the olefins and remove at least some of the sulfur from said feed before said hydroconverted feed is passed to a hydrotreating zone, thereby reducing hydrogen reqirements in the hydrotreating zone, said steam hydroconversion catalyst being sulfided prior to use.

15. The process of claim 14 wherein the feed contains at least 500 ppm of sulfur.

16. The process of claim 15 wherein the catalyst contains from 1 to 10 wt.% of a metal selected from the group consisting of alkali metal, alkaline earth metal, and mixture thereof.

17. The process of claim 16 wherein the amount of molybdenum sulfide on said catalyst base ranges from 25 to 50 wt.%.

18. The process of claim 17 wherein the alumina base has a surface area ranging from 150 to 350 m²/g.

19. The process of claim 18 wherein the catalyst contains 15 to 30 wt.% molybdenum sulfide 2 to 10 wt.% cobalt sulfide and 2 to 8 wt.% cesium.

20. The process of claim 18 wherein the catalyst comprises from 25 to 50 wt.% molybdenum sulfide and 2 to 8 wt.% of a metal selected from the group consisting of cesium and barium on η-alumina.

21. The process of claim 17 wherein the catalyst comprises 20 to 30 wt.% molybdenum sulfide on said ferric oxide base containing 1 to 15 wt.% chromic oxide.

* * * * *